US009179063B1

(12) United States Patent
Vegh

(10) Patent No.: US 9,179,063 B1
(45) Date of Patent: Nov. 3, 2015

(54) CAMERA TRIGGERING SYSTEM FOR PANORAMA IMAGING

(71) Applicant: Dennis J. Vegh, Mesa, AZ (US)

(72) Inventor: Dennis J. Vegh, Mesa, AZ (US)

( * ) Notice: Subject to any disclaimer, the term of this patent is extended or adjusted under 35 U.S.C. 154(b) by 421 days.

(21) Appl. No.: 13/683,953

(22) Filed: Nov. 21, 2012

Related U.S. Application Data

(60) Provisional application No. 61/562,837, filed on Nov. 22, 2011.

(51) Int. Cl.
*H04N 5/232* (2006.01)
(52) U.S. Cl.
CPC ................................ *H04N 5/23238* (2013.01)
(58) Field of Classification Search
CPC . H04N 5/2251; H04N 5/2252; H04N 5/2253; H04N 5/2254; G08B 13/19619
USPC .......................................................... 348/373
See application file for complete search history.

(56) References Cited

U.S. PATENT DOCUMENTS

| 2009/0216394 A1* | 8/2009 | Heppe et al. ..................... 701/16 |
| 2013/0048792 A1* | 2/2013 | Szarek et al. ................. 244/175 |
| 2014/0037278 A1* | 2/2014 | Wang .............................. 396/55 |

* cited by examiner

*Primary Examiner* — Twyler Haskins
*Assistant Examiner* — Fayez Bhuiyan
(74) *Attorney, Agent, or Firm* — Schmeiser, Olsen & Watts LLP

(57) ABSTRACT

A camera triggering system for panorama imaging is provided. The system comprises a mounting member comprising holes, wherein a predetermined number of magnets are coupled within the holes. The system further comprises a base plate with the magnetic proximity sensor coupled to it. The system further comprises a camera mount coupled to the base plate. The system further comprises mounting connectors to connect the system to a camera support structure such as an unmanned aircraft or a tripod. The base plate and camera mount carrying the camera rotates with respect to the mounting member. As the sensor passes by the magnets, the trigger for the shutter is activated.

18 Claims, 9 Drawing Sheets

CAMERA TRIGGERING SYSTEM FOR PANORAMA IMAGING

CROSS REFERENCE TO RELATED APPLICATION[S]

This application claims priority to U.S. Provisional Patent Application to Vegh, entitled "CAMERA TRIGGERING SYSTEM FOR PANORAMA IMAGING," Ser. No. 61/562,837, filed Nov. 22, 2011, the disclosure of which is hereby incorporated entirely herein by reference.

BACKGROUND OF THE INVENTION

1. Technical Field

This invention relates generally to a camera triggering system for panorama imaging and more particularly to a camera triggering system for panorama imaging that is mountable to another device.

2. State of the Art

Panorama or Panoramic photos are generally considered photos that are greater in horizontal field of view than that of the human eye which is about 160 degrees. There are several types of panorama cameras and methods of acquisition. For the purpose of this invention we will focus on the method known as "Segmented Capture" or "Stitched Panoramas."

Segmented/Stitched capture panoramas are created by joining together multiple photographs with slightly overlapping edges on horizontal field of view. Software is then used to blend the edges of the photos together to create a seamless 'stitched' image.

It is important that the images captured for a segmented panorama be captured at fairly precise angular increments. The angle of increments is dependent on the lens field of view. Narrow field of view lenses will require more increments than wide angle lenses. It is common practice to use wide angle or fisheye lenses which usually require between 4 and 8 images to capture a full 360 degree horizontal field of view panorama. So, for example a 6-shot segmented panorama would need each photo captured 60 horizontal degrees apart from one another. Six shots at 60 degrees apart completes a 360 degree panorama.

There are various mounts that may be utilized for capturing a panorama image; however, these conventional mounts require a photographer to touch or otherwise interface with the camera during the acquisition of images for the panorama.

Accordingly, there is a need for an improved mounting system that allows for capture of panorama images without the need of human interface with the camera during acquisition of images.

DISCLOSURE OF THE INVENTION

The present invention relates to a camera triggering system for panorama imaging that is mountable to an aircraft, a tripod or other camera supporting device.

Some embodiments of the invention include a camera triggering system for panorama imaging. The system comprises a mounting member comprising holes, wherein a predetermined number of magnets are coupled within the holes. The system further comprises a base plate with the magnetic proximity sensor coupled to it. The system further comprises a camera mount coupled to the base plate. In some embodiments the camera mount comprises a tubular structure to facilitate mounting to a small unmanned aircraft and act as a landing gear for the aircraft. The system, in some embodiments, further comprises mounting connectors to connect the system to the unmanned aircraft. In other embodiments, the camera mount comprises mounting connectors to connect the system to a tripod or other type of support for a camera.

In some embodiments, the base plate is rotational with respect to the mounting member. A motor is coupled to the mounting member, wherein the motor drives the rotation of the base plate, which in turn rotates the camera mount to which the camera is attached. As the camera carried by the camera mount and magnetic proximity sensor rotates, the sensor passes by the magnets. Each time the sensor passes by a magnet, the sensor closes an electrical circuit and/or creates a signal which commands the camera to trigger the shutter and capture the image.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a camera triggering system for panorama imaging that is mountable to an aircraft.

The camera mount has a motor driven pan axis that spins the camera along the horizontal axis and further has a system in which the camera is automatically triggered to capture photos at user defined angular increments as the camera mount rotates about the pan axis or a horizontal rotation. The photographer is not required to touch or interface with the camera in any way during the acquisition of images for the panorama. The camera mount accomplishes this by way of magnets and magnetic proximity sensors.

Figure 1:
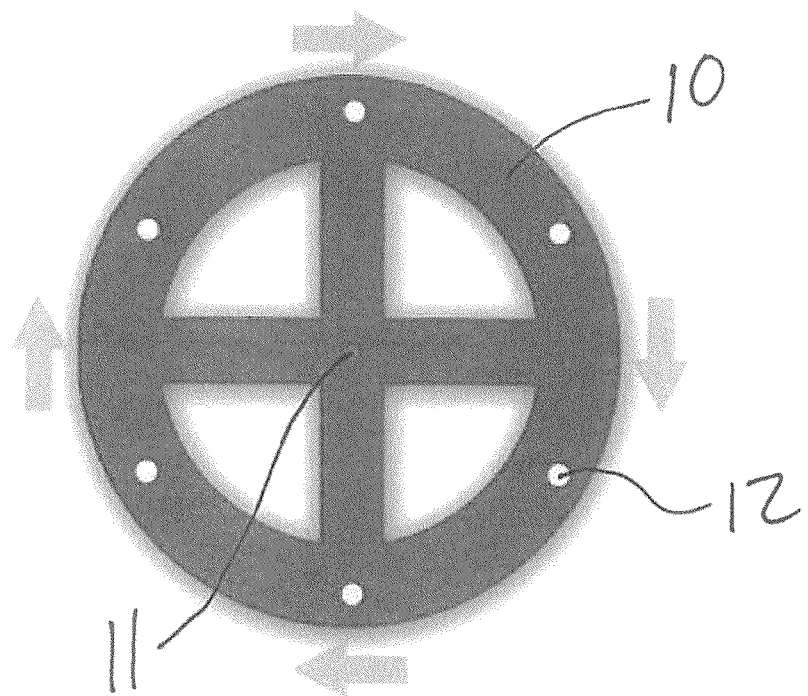
FIG. 1 is a top view of a mounting member of a camera triggering system for panorama imaging.

Referring to the drawings, FIG. 1 is a top view of a mounting member 10 of a camera triggering system, such as a ring. In some embodiments, the mounting member 10 can rotate about its longitudinal axis 11. The mounting member 10 further comprises a radial array of magnets 12, wherein the magnets 12 are located along the perimeter of the mounting member 10. In this example there are six magnets 12 located a predetermined distance from another magnet 12 along the perimeter of the mounting member 10. For example the distance between each magnet 12 may be equal minor arcs. In the example of FIG. 1, the minor arc between each magnet may be 60 degrees. While shown with six magnets 12 in FIG. 1, it will be understood that there can be any number of magnets 12 depending on how many images need to be captured.

Figure 2:
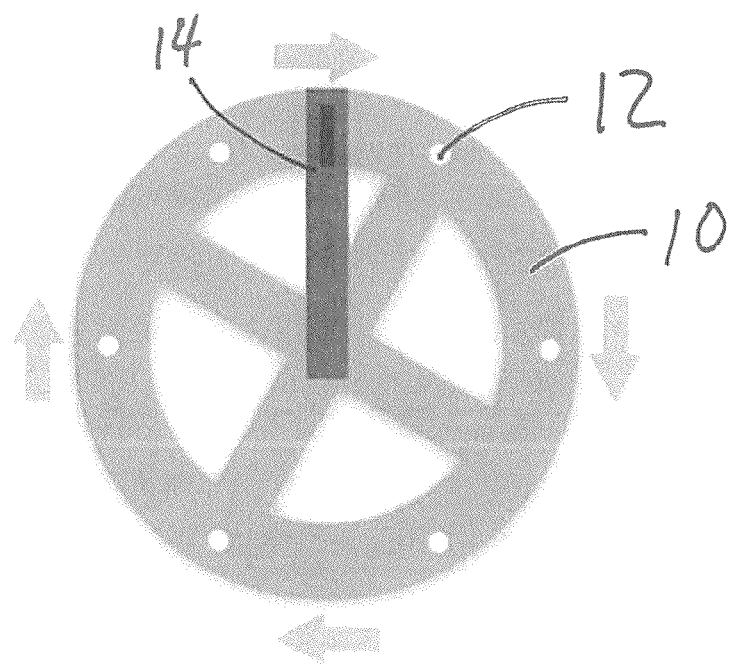
FIG. 2 is a top view of a mounting member with a magnetic proximity sensor of a camera triggering system for panorama imaging.

FIG. 2 shows the same mounting member 10 as in FIG. 1 adjacent a magnetic proximity sensor 14. The sensor 14 and the mounting member 10 have a rotational relationship, wherein either the sensor 14 may rotate with respect to the mounting member 10, or conversely, the mounting member 10 may rotate with respect to the sensor 14. FIG. 2 illustrates an exemplary way that the magnets 12 pass by the sensor 14. When the magnets 12 pass the sensor 14 a signal is generated and can be sent to a camera for purpose of triggering the camera shutter. The magnets 12 may pass by the sensor 14 in various ways. One way is by the mounting member 10 rotating with respect to the sensor 14, wherein the magnets 12 coupled to the mounting member 10 pass by the sensor 14 in response to rotation of the mounting member 10. Another way is by the sensor 14 rotating with respect to the mounting member 10, wherein the sensor 14 passes by the magnets coupled to the mounting member 10 in response to rotation of the sensor 14.

Figure 3:
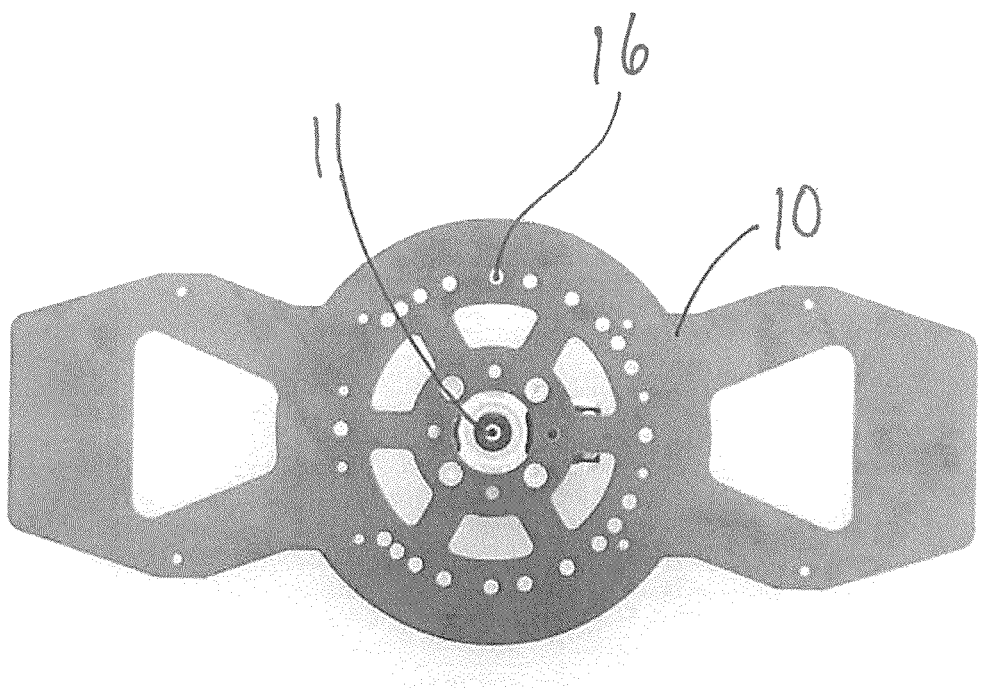
FIG. 3 is another embodiment of a mounting member of a camera triggering system for panorama imaging.

FIG. 3 shows another embodiment of a mounting member 10. There are various holes 16 in a radial array. The holes 16 have various spacing to allow for numerous angular increment minor arcs in which magnets 12 can be installed into. The mounting member 10 has holes 16 at 45, 60 and 72 degree increments which allow for 3, 4, 5, 6, 8 photo panoramas to be captured. More specifically, the 3 photo panoramas are captured using magnets 12 spaced apart at equal minor arc lengths of 120 degrees; the 4 photo panoramas are captured using magnets 12 spaced apart at equal minor arc lengths of 90 degrees; the 5 photo panoramas are captured using magnets 12 spaced apart at equal minor arc lengths of 72 degrees; the 6 photo panoramas are captured using magnets 12 spaced apart at equal minor arc lengths of 60 degrees; and the 8 photo panoramas are captured using magnets 12 spaced apart at equal minor arc lengths of 45 degrees.

Figure 4:
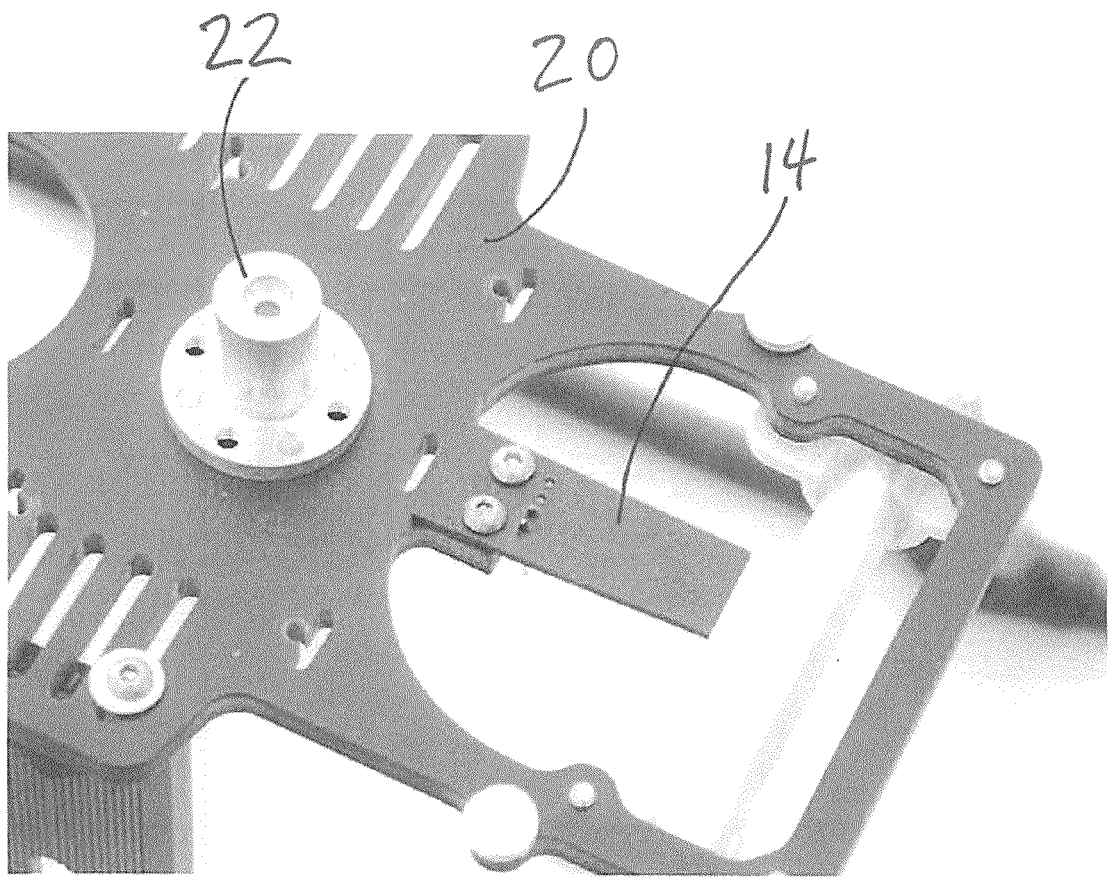
FIG. 4 is a perspective view of a base plate of a camera triggering system for panorama imaging.

FIG. 4 shows a magnetic proximity sensor 14 installed on a base plate 20 in a fixed position with respect to the base plate 20. The mounting member 10 (shown in FIG. 3) is operatively coupled to the base plate 20. For example, the mounting member 10 may be rotatably coupled the base plate 20 such that there is a common rotational axis 22. The magnets 12 coupled to the mounting member 10 are positioned within range of the sensor 14 such that when the magnet 12 passes by the sensor 14 a camera shutter trigger signal is generated.

Figure 5:
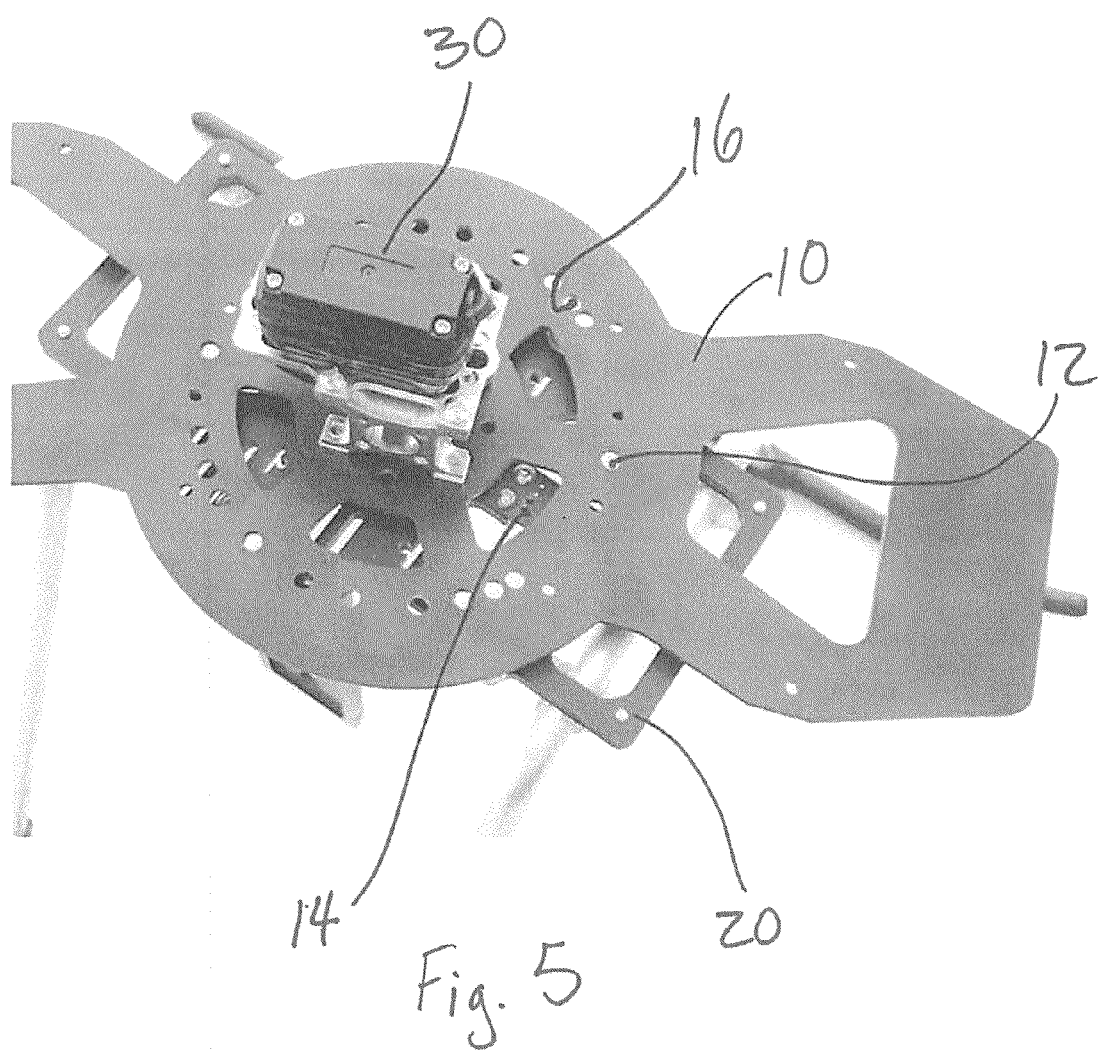
FIG. 5 is a top view of a mounting member coupled to a base plate of a camera triggering system for panorama imaging.
Figure 6:
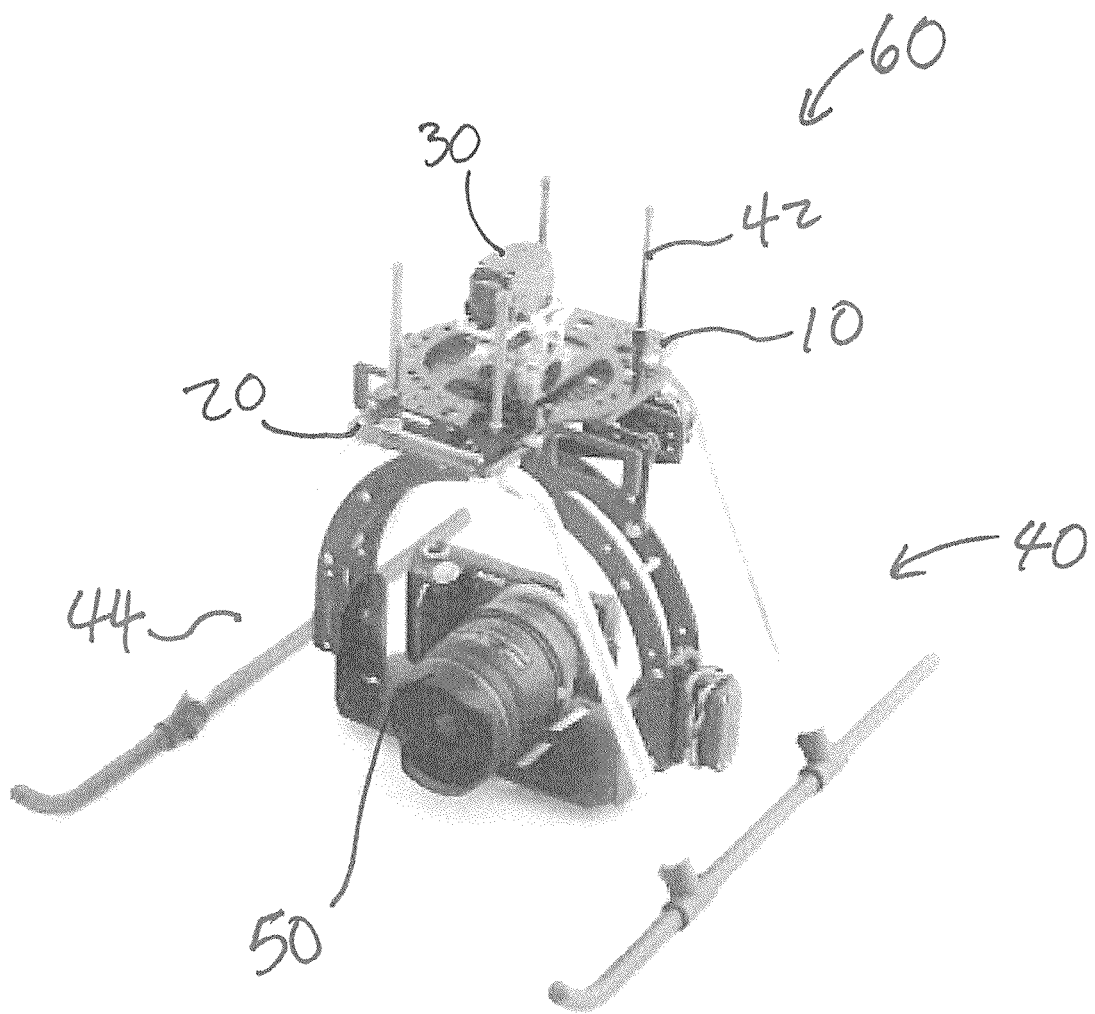
FIG. 6 is a perspective view of a camera triggering system for panorama imaging carrying a camera.
Figure 7:
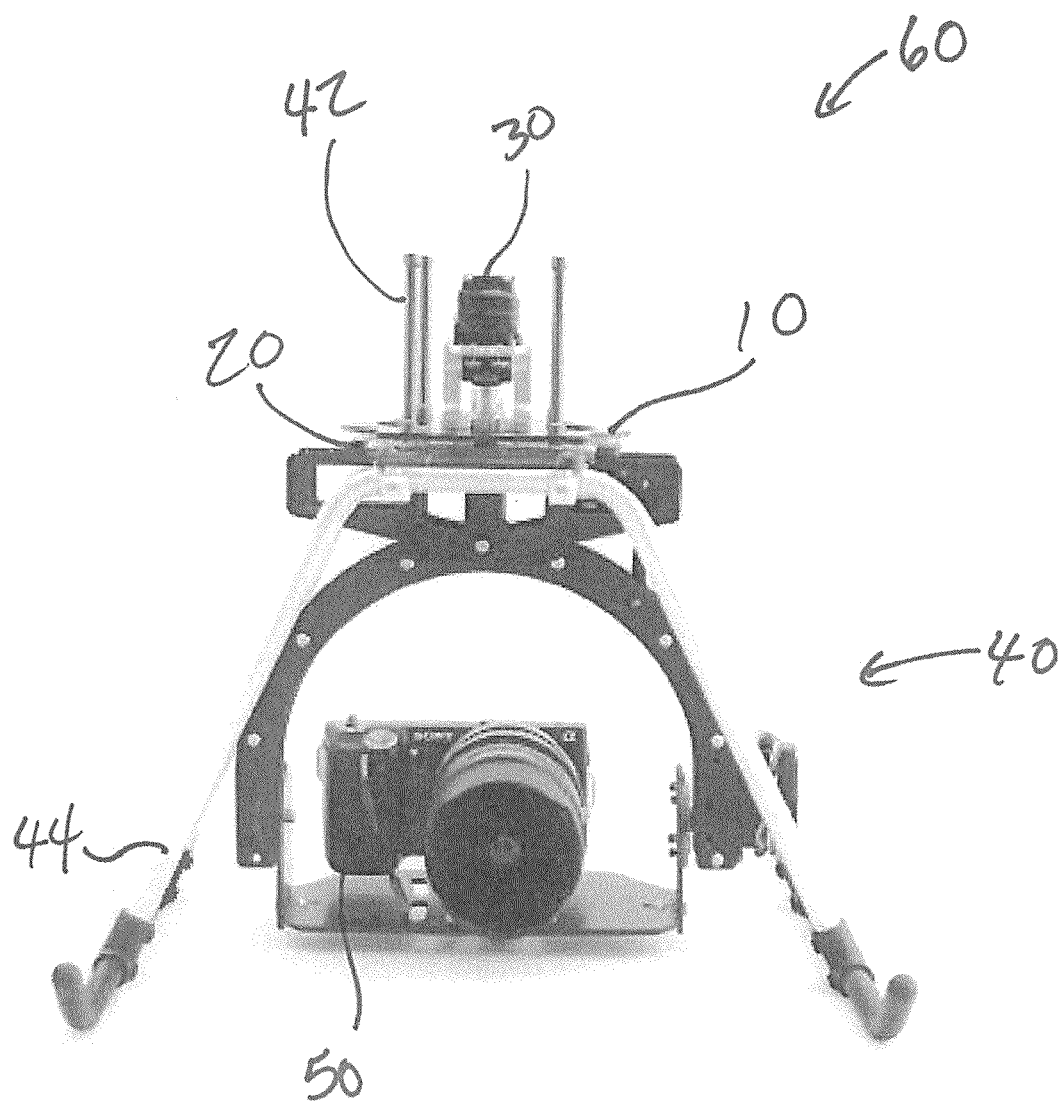
FIG. 7 is a front view of a camera triggering system for panorama imaging carrying a camera.
Figure 8:
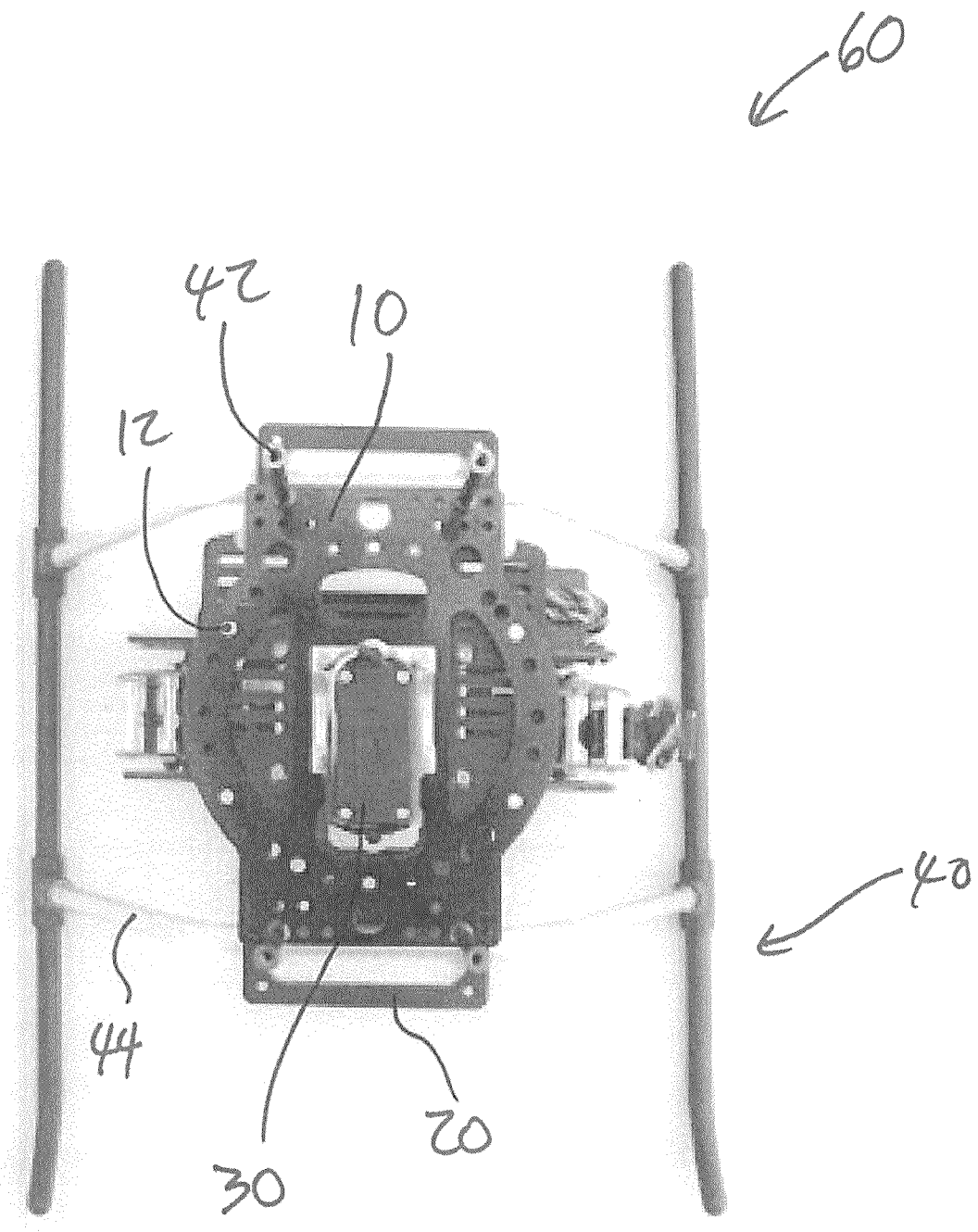
FIG. 8 is a top view of a camera triggering system for panorama imaging carrying a camera.
Figure 9:
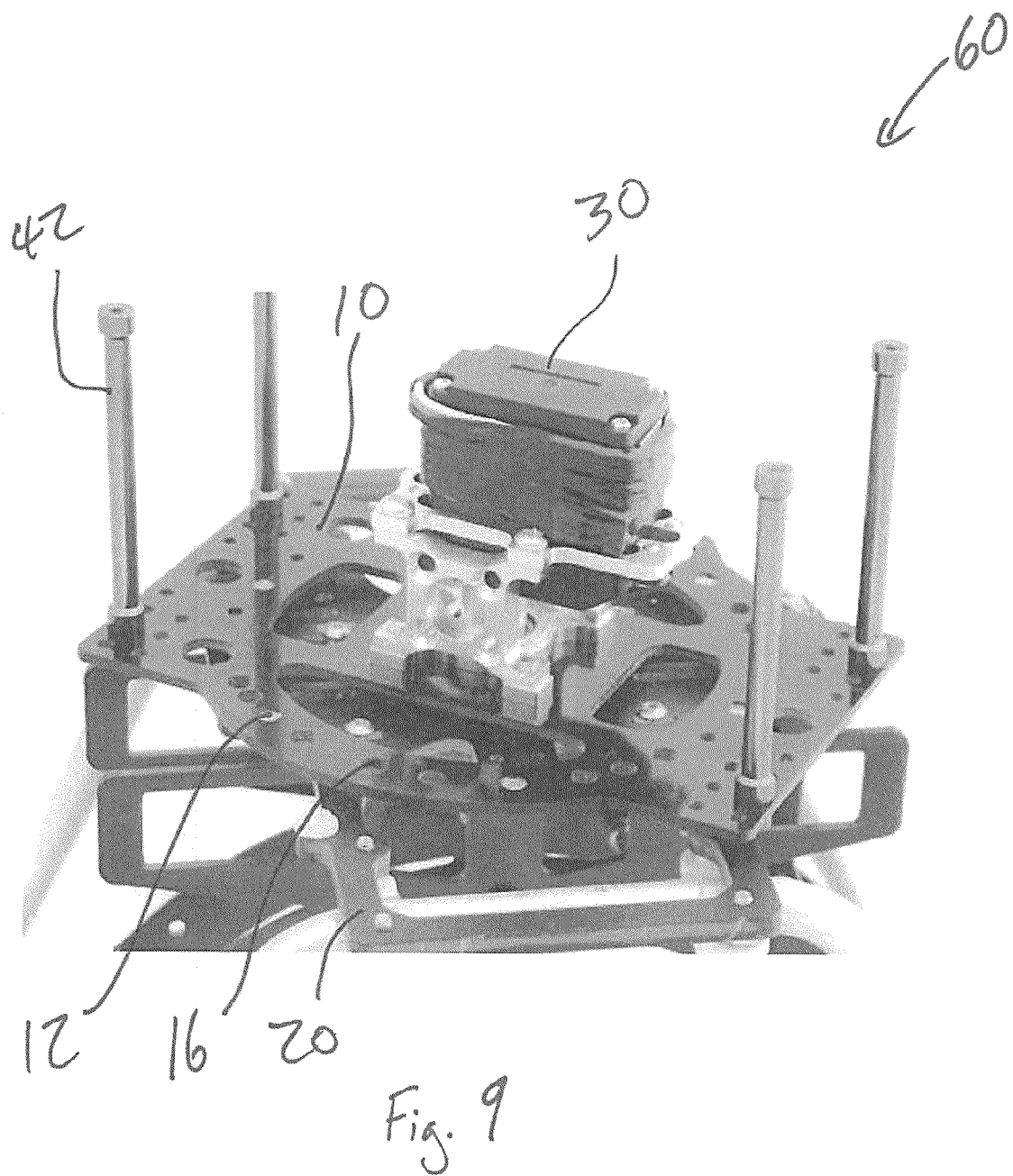
FIG. 9 is a close-up perspective view of a camera triggering system for panorama imaging carrying a camera.

FIG. 5 shows the base plate 20 and the mounting member 10 assembled together. As shown, a motor 30 is coupled to the mounting member 10. The motor 30 drives the rotation of either the mounting member 10 or the base plate 20 about the pan axis 22.

FIGS. 6-9 depict a camera triggering system 60 for panorama imaging fully assembled. The system comprises a mounting member 10, with magnets 12 coupled to holes 16, a base plate 20 with the magnetic proximity sensor 14 (see FIG. 4 and FIG. 5) coupled to it in a fixed position with respect to the base plate. The system 60 further comprises a camera mount 40 coupled to the base plate 20, wherein the camera mount 40 comprises a tubular structure 44 to facilitate mounting to a small unmanned aircraft and act as a landing gear for the aircraft. The system further comprises mounting connectors 42 to connect the system 60 to the unmanned aircraft.

In the embodiment shown in FIGS. 6-9, the mounting member 10 is held in a fixed position with respect to the unmanned aircraft, wherein the motor 30 drives the rotation of the base plate 20 about the pan axis 22, which in turn rotates the camera mount 40 to which the camera 50 is attached. The magnetic proximity sensor 14 is coupled to the base plate 20. The magnets 12 are arranged in a radial array in holes 16 of the mounting member 10. The number of magnets 12 and their angular separation from one another determines how many and what angular increment the camera 50 captures an image. As the camera 50 and magnetic proximity sensor 14 rotates, the sensor 14 passes by the magnets 12. Each time the sensor 14 passes by a magnet 12, the sensor 14 closes an electrical circuit and/or creates a signal which commands the camera 50 to trigger the shutter and capture the image. Because the sensor 14 commands the camera 50 to trigger the shutter, the user need only activate the motor 30 to pan the camera mount 40. The acquisition of the images happens automatically via magnets 12 and sensor 14 with no physical interaction from the user.

While it is shown that the camera triggering system for panorama imaging uses magnets and magnetic sensors, it is understood that the system does not need to only use magnets. Other sensors and trigger devices may be used to generate the trigger signal. For example, it is contemplated that the trigger signals can be optical sensors with light, photo diodes with UV rays or x-rays, laser emitter with a detector, or like.

Further, while the examples of the camera triggering system for panorama imaging shown in the figures are directed to a system that is mountable to an aircraft, it is understood that the system may be adjusted and configured to mount to a tripod or other camera supporting structure or system available.

Figure 10:
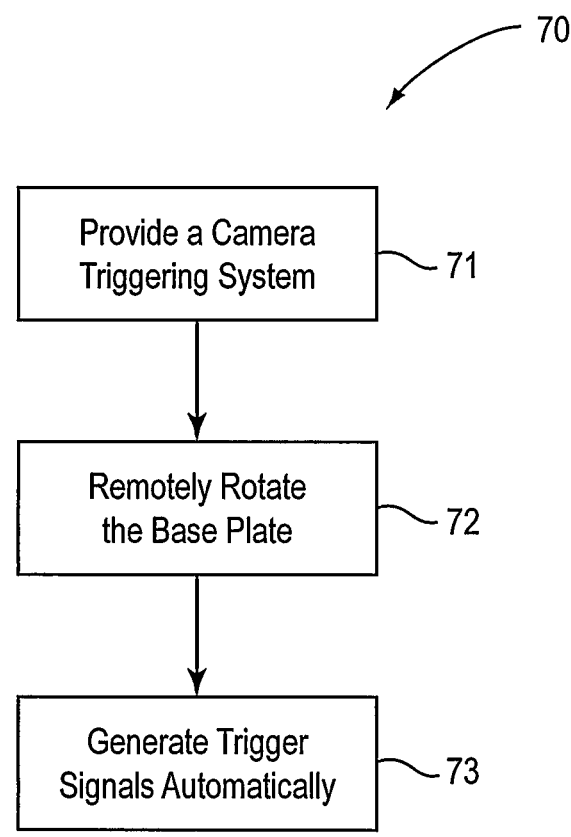
FIG. 10 is a schematic view of an embodiment of a method of using a camera triggering system for panorama imaging in accordance with the present invention.

Another embodiment as shown in FIG. 10 is a method 70 of using a camera triggering system for panorama imaging. The method 70 comprises the steps of providing a camera triggering system (Step 71), remotely rotating the base plate (Step 72), and generating trigger signals automatically in response to rotation of the base plate (Step 73). Step 71 of providing a camera triggering system comprises providing a mounting member with a triggering device, a base plate with a sensor rotatably coupled to the mounting member, and a camera mount retaining and supporting a camera, the camera mount coupled to the base plate.

Step 73 of generating trigger signals may comprise generating a trigger signal in response to moving the sensor passed the triggering device of the mounting member as the base plate rotates about the pan axis. In some embodiments, the triggering device includes a radial array of magnets coupled to the mounting member in equal minor arcs about a pan axis and the sensor is a magnetic proximity sensor.

Step 71 providing the camera triggering system may further comprise providing an unmanned aircraft coupled to the mounting member. The method 70 may then comprise remotely flying the unmanned aircraft. Further, the method 70 at Step 72 of remotely rotating the base plate may comprise remotely rotating the camera mount while the unmanned aircraft is in flight. The camera mount may further comprise a tubular structure to function as landing gear of the unmanned aircraft. In this embodiment, the method may further comprise landing the unmanned aircraft with the camera triggering system on the tubular structure.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A camera triggering system for panorama imaging, the system comprising:
   a mounting member including a predetermined number of magnets coupled to the mounting member in equal minor arcs about a pan axis;
   a base plate having a fixed magnetic proximity sensor, the base plate rotatably coupled to the mounting member; and
   a camera mount retaining and supporting a camera, the camera mount coupled to the base plate, wherein a trigger signal is produced in response to moving the proximity sensor passed a magnet of the mounting member as the base plate rotates about the pan axis, the trigger signal operating the camera to capture an image.

2. The system of claim 1, further comprising a camera support structure, wherein the mounting member is coupled to the camera support structure.

3. The system of claim 2, wherein the camera support structure is one of a tripod, a monopod, a wall mount or an unmanned aircraft.

4. The system of claim 1, wherein the predetermined number of magnets is one of 3, 4, 5, 6 or 8.

5. The system of claim 4, wherein the predetermined number of magnets is adjustable by the user.

6. The system of claim 4, wherein the mounting member comprises holes, wherein the magnets couple to the holes of the mounting member.

7. A camera triggering system for panorama imaging, the system comprising:
   an unmanned aircraft;
   a mounting member coupled to the unmanned aircraft, the mounting member including a radial array of magnets coupled to the mounting member in equal minor arcs about a pan axis;
   a base plate having a fixed magnetic proximity sensor, the base plate rotatably coupled to the mounting member; and
   a camera mount retaining and supporting a camera, the camera mount coupled to the base plate, wherein a trigger signal is produced in response to moving the proximity sensor passed a magnet of the mounting member as the base plate rotates about the pan axis, the trigger signal operating the camera to capture an image.

8. The system of claim 7, wherein the predetermined number of magnets is one of 3, 4, 5, 6 or 8.

9. The system of claim 8, wherein the predetermined number of magnets is adjustable by the user.

10. The system of claim 8, wherein the mounting member comprises holes, wherein the magnets couple to the holes of the mounting member.

11. The system of claim 7, wherein the camera mount comprises a tubular structure to function as landing gear of the unmanned aircraft.

12. The system of claim 11, wherein the unmanned aircraft is a helicopter.

13. A method of using a camera triggering system for panorama imaging, the method comprising:
    providing a camera triggering system comprising:
      a mounting member with a triggering device, wherein the triggering device includes a radial array of magnets coupled to the mounting member in equal minor arcs about a pan axis and the sensor includes a magnetic proximity sensor coupled to the base plate;
      a base plate with a sensor rotatably coupled to the mounting member; and
      a camera mount retaining and supporting a camera, the camera mount coupled to the base plate; and
    remotely rotating the base plate;
    generating trigger signals automatically in response to rotation of the base plate, wherein generating trigger signals comprises generating a trigger signal in response to moving the sensor passed the triggering device of the mounting member as the base plate rotates about the pan axis.

14. The method of claim 13, wherein providing the camera triggering system further comprises providing an unmanned aircraft coupled to the mounting member.

15. The method of claim 14, further comprising remotely flying the unmanned aircraft.

16. The method of claim 15, wherein remotely rotating the base plate comprises remotely rotating the camera mount while the unmanned aircraft is in flight.

17. The method of claim 14, wherein the camera mount further comprises a tubular structure to function as landing gear of the unmanned aircraft.

18. The method of claim 17, further comprising landing the unmanned aircraft with the camera triggering system on the tubular structure.

\* \* \* \* \*